(12) United States Patent
Kwon et al.

(10) Patent No.: US 9,884,468 B2
(45) Date of Patent: Feb. 6, 2018

(54) TAILOR WELDED BLANK, MANUFACTURING METHOD THEREOF, AND HOT STAMPED COMPONENT USING TAILOR WELDED BLANK

(71) Applicant: HYUNDAI STEEL COMPANY, Incheon (KR)

(72) Inventors: Min-Suck Kwon, Ulsan (KR); Yun-Gyu Kim, Ulsan (KR); Young-Jin Kim, Anyang-si (KR); Chung-Yun Kang, Busan (KR); Jong-Pan Kong, Busan (KR); Myeong-Hwan Oh, Busan (KR); Hyeon-Jeong Shin, Busan (KR); Seung-Taik Oh, Yongin-si (KR)

(73) Assignee: HYUNDAI STEEL COMPANY, Incheon (KR)

( * ) Notice: Subject to any disclaimer, the term of this patent is extended or adjusted under 35 U.S.C. 154(b) by 370 days.

(21) Appl. No.: 14/630,359

(22) Filed: Feb. 24, 2015

(65) Prior Publication Data

US 2015/0165726 A1    Jun. 18, 2015

Related U.S. Application Data

(62) Division of application No. 13/903,682, filed on May 28, 2013, now Pat. No. 9,381,720.

(30) Foreign Application Priority Data

Dec. 3, 2012    (KR) .................. 10-2012-0139035

(51) Int. Cl.
*B32B 15/01* (2006.01)
*B23K 26/24* (2014.01)
(Continued)

(52) U.S. Cl.
CPC ............ *B32B 15/01* (2013.01); *B23K 26/211* (2015.10); *B23K 26/24* (2013.01); *B23K 26/32* (2013.01);
(Continued)

(58) Field of Classification Search
CPC .. B23K 26/203; B23K 26/3293; B32B 15/01; B32B 15/013
See application file for complete search history.

(56) References Cited

U.S. PATENT DOCUMENTS

2008/0011720 A1    1/2008  Briand et al.
2009/0220815 A1    9/2009  Canourgues et al.
(Continued)

FOREIGN PATENT DOCUMENTS

CN    101104225 A    1/2008
DE    102007015963 A1    10/2008
(Continued)

OTHER PUBLICATIONS

Uchihara Masato, Joining Technologies for Automotive Steel Sheets, pp. 722-730.
(Continued)

*Primary Examiner* — Jessee Roe
(74) *Attorney, Agent, or Firm* — Hauptman Ham, LLP

(57) ABSTRACT

Disclosed are a tailor welded blank and a manufacturing method thereof. The tailor welded blank is manufactured by connecting blank elements of different materials or thicknesses, thereby eliminating quality problems in a welded zone. A hot stamped component is manufactured by hot stamping the tailor welded blank formed by laser-welding blank elements made of coated steel plates having different strengths or thicknesses using a filler wire, wherein a laser-welded zone has a martensite structure.

6 Claims, 5 Drawing Sheets

(51) Int. Cl.
    *B32B 7/04*     (2006.01)
    *B23K 26/32*     (2014.01)
    *B23K 26/322*     (2014.01)
    *B23K 26/211*     (2014.01)
    *B23K 101/18*     (2006.01)
    *B23K 101/34*     (2006.01)
    *B23K 103/00*     (2006.01)
    *B23K 103/08*     (2006.01)

(52) U.S. Cl.
    CPC .............. *B23K 26/322* (2013.01); *B32B 7/04* (2013.01); *B32B 15/011* (2013.01); *B32B 15/013* (2013.01); *B23K 2201/185* (2013.01); *B23K 2201/34* (2013.01); *B23K 2203/08* (2013.01); *B23K 2203/50* (2015.10); *Y10T 428/12229* (2015.01); *Y10T 428/12396* (2015.01); *Y10T 428/12757* (2015.01); *Y10T 428/12799* (2015.01)

(56) References Cited

U.S. PATENT DOCUMENTS

| | | |
|---|---|---|
| 2010/0221572 A1 | 9/2010 | Laurent et al. |
| 2013/0098878 A1 | 4/2013 | Briand et al. |
| 2015/0030382 A1 | 1/2015 | Cretteur et al. |
| 2015/0043962 A1 | 2/2015 | Miyazaki et al. |

FOREIGN PATENT DOCUMENTS

| | | |
|---|---|---|
| DE | 102010019258 A1 | 11/2011 |
| EP | 0279866 A1 | 8/1988 |
| JP | 05057468 A | 3/1993 |
| JP | 2002219589 A | 8/2002 |
| JP | 2004090045 A | 3/2004 |
| JP | 2006021224 A | 1/2006 |
| JP | 2006218518 A | 8/2006 |
| JP | 2007038269 A | 2/2007 |
| JP | 2007154257 A | 6/2007 |
| JP | 2011025900 A | 2/2011 |
| JP | 2013220445 A | 10/2013 |
| KR | 10200900005004 A | 7/2010 |
| KR | 101035753 B1 | 5/2011 |
| WO | 2011138278 A1 | 11/2011 |
| WO | 2012007664 A1 | 1/2012 |

OTHER PUBLICATIONS

Chinese Office Action dated Feb. 27, 2015.
Korean Notice of Allowance dated Sep. 24, 2014.
Masato Uchihara, Joining techologies for automotive steel sheets, book, received on Sep. 16, 2008, published on Apr. 2011, p. 249-259, vol. 25, No. 4, Welding International.
European Search Report dated May 2, 2014.
Korean Office Action dated Jan. 16, 2014.
Japanese Office Action dated Apr. 3, 2015.
U.S. Office Action dated Jul. 2, 2015 in connection with the counterpart U.S. Appl. No. 13/903,682.
Japanese Notice of Allowance dated Dec. 18, 2015 in connection with the counterpart Japanese Patent Application No. 2014-551212.

TAILOR WELDED BLANK, MANUFACTURING METHOD THEREOF, AND HOT STAMPED COMPONENT USING TAILOR WELDED BLANK

CROSS-REFERENCE TO RELATED APPLICATION

The present application is a Divisional Application of U.S. Ser. No. 13/903,682, now U.S. Pat. No. 9,381,720, filed on 28 May 2013, which claims the benefit of priority Korean Patent Application No. 10-2012-0139035 filed on 3 Dec. 2012, and all the benefits accruing therefrom under 35 U.S.C. §119, the contents of which is incorporated by reference in its entirety.

BACKGROUND

1. Technical Field

The present invention relates to a tailor welded blank which is manufactured by connecting blanks of different materials or thicknesses, a manufacturing method thereof, and a hot stamped part component using the tailor welded blank. More particularly, the present invention relates to a tailor welded blank capable of preventing occurrence of quality problems in a welded zone, a manufacturing method thereof, and a hot stamped component using the tailor welded blank.

2. Description of the Related Art

Respective parts of a vehicle employ various components having different strengths according to functions thereof. For example, a vehicle part for absorbing impact upon collision may employ components having relatively low strength, and a vehicle part required to maintain its shape for securing a survival space for occupants may employ components having relatively high strength.

When a shock-absorbing part of a vehicle has high strength, the shock-absorbing part transfers impact to other parts instead of suitably absorbing the impact upon collision, whereby occupants and other vehicle parts can be exposed to excessive impact.

To fulfill continuous demand for weight and cost reduction in the field of vehicles, a single component is required to have different strengths according to sections thereof.

That is, some sections of a component are required to have relatively high strength for protection of occupants, and other sections thereof are required to have relatively low strength for impact absorption.

One example of such a component includes a B-pillar of a vehicle.

FIG. 1 is an enlarged perspective view of a chassis and a B-pillar of a vehicle.

In a certain car, a B-pillar 1 is disposed between a front door and a rear door and connects a bottom surface of a chassis to a roof.

In the B-pillar 1, an upper portion 1a is required to have a higher tensile strength than a lower portion 1b thereof. The reason for the provision of differences in strength according to sections of the B-pillar provided as a unitary component is because there are two sections in the unitary component, i.e. a structural section (for example, an upper portion required to support a vehicle roof when the vehicle overturns) that needs to maintain its shape upon collision and a shock-absorbing section (for example, a lower portion having a high possibility of lateral collision with other vehicles) that needs to be crushed to absorb shock.

That is, the upper portion 1a of the B-pillar 1 needs high strength because it needs to maintain its shape upon vehicle collision in order to secure a safe space to prevent occupant injury, whereas the lower portion 1b of the B-pillar 1 needs relatively low strength because it needs to be deformed to absorb impact upon vehicle collision. If the lower portion 1b of the B-pillar 1 has high strength as in the upper portion 1a, the lower portion 1b of the B-pillar 1 cannot absorb impact upon lateral collision, whereby impact can be transferred to other structural members.

Although detailed strength can vary according to types or shapes of vehicles, the upper portion 1a of the B-pillar 1 needs a tensile strength of about 1500 MPa, and the lower portion 1b of the B-pillar 1 needs a tensile strength of about 500 to 1,000 MPa.

In the related art, a component is first made of a low strength material and a separate reinforcing material is attached to a section required to have high strength. Further, when a unitary component is required to have different strengths according to sections, a material having high hardenability (or a thick material) and a low strength material having low hardenability (or a thin material) are laser-welded to form a blank, followed by forming a final product through hot stamping.

A blank manufactured by laser-welding components of different materials (or thicknesses) is referred to as a tailor welded blank, which may also be manufactured using a coated steel plate.

When the coated steel plate is laser-welded, a composition material of a coating layer is fused and enters a molten pool of a welded zone, whereby the welded zone has different physical properties than a base material thereof.

For example, when the coating layer is an Al—Si or Zn-based layer, coating components can enter the welded zone upon laser-welding, thereby causing deterioration in physical properties of the welded zone.

In the related art, laser welding is performed after removing a coating layer from a section to be subjected to laser welding, thereby preventing the coating components from intruding into the welded zone. However, this method causes increase in manufacturing costs due to addition of a process of removing the coating layer.

One example of a background technique is disclosed in Korean Patent Publication No. 10-2009-0005004A (published on Jan. 12, 2009), entitled "Method for manufacturing a weld component with very high mechanical characteristics from a coated lamination sheet".

BRIEF SUMMARY

It is an aspect of the present invention to provide a tailor welded blank having excellent quality in a welded zone without removing a coating layer from the welded zone, and a manufacturing method thereof.

It is another aspect of the present invention to provide a hot stamped component using the tailor welded blank, in which the welded zone has a martensite structure after hot stamping.

In accordance with one aspect, the present invention provides a method of manufacturing a tailor welded blank, which includes: laser-welding blank elements made of coated steel plates having different strengths or thicknesses using a filler wire.

The filler wire may have a composition, in which a welded zone does not generate a ferrite structure at temperatures ranging from 800° C. to 950° C., by taking intrusion of a composition of coating layers of the coated steel plates into the welded zone into account.

The coated steel plate may include an Al—Si coating layer, and the filler wire may have a higher amount of an austenite-stabilizing element than a base material of each of the coated steel plates. Here, the austenite-stabilizing element may include C or Mn.

The C content of the filler wire may be 0.1% by weight (wt %) to 0.8 wt % higher than that of the base material of the coated steel plate, and the Mn content of the filler wire may be 1.5 wt % to 7.0 wt % higher than that of the base material of the coated steel plate.

In accordance with another aspect, the present invention provides a tailor welded blank manufactured by laser-welding blank elements made of coated steel plates having different strengths or thicknesses, using a filler wire, wherein a laser-welded zone has a composition providing an austenite structure at temperatures ranging from 800° C. to 950° C.

The welded zone may have a composition in which a base material and a coating layer of each of the coated steel plates are mixed with the filler wire.

In accordance with a further aspect, the present invention provides a hot stamped component manufactured by hot stamping a tailor welded blank formed by laser-welding blank elements made of coated steel plates having different strengths or thicknesses using a filler wire, wherein a laser-welded zone has a martensite structure.

Each of the blank elements may include a boron steel plate having hardenability as a base material and an Al—Si or Zn coating layer, and the filler wire may have a higher amount of an austenite-stabilizing element than the base material of the coated steel plate. Here, the austenite-stabilizing element may include C or Mn.

According to the present invention, a tailor welded blank is manufactured using a filler wire that is designed to prevent a fused coating layer from intruding into a welded zone of the blank, so that the welded zone has a full martensite structure after hot stamping.

Therefore, in manufacture of the tailor welded blank, removal and recoating of the coating layer are not needed, thereby obtaining cost reduction and improved productivity.

BRIEF DESCRIPTION OF DRAWINGS

The above and other aspects, features, and advantages of the present invention will become apparent from the detailed description of the following embodiments in conjunction with the accompanying drawings, in which.

DETAILED DESCRIPTION

Figure 1:
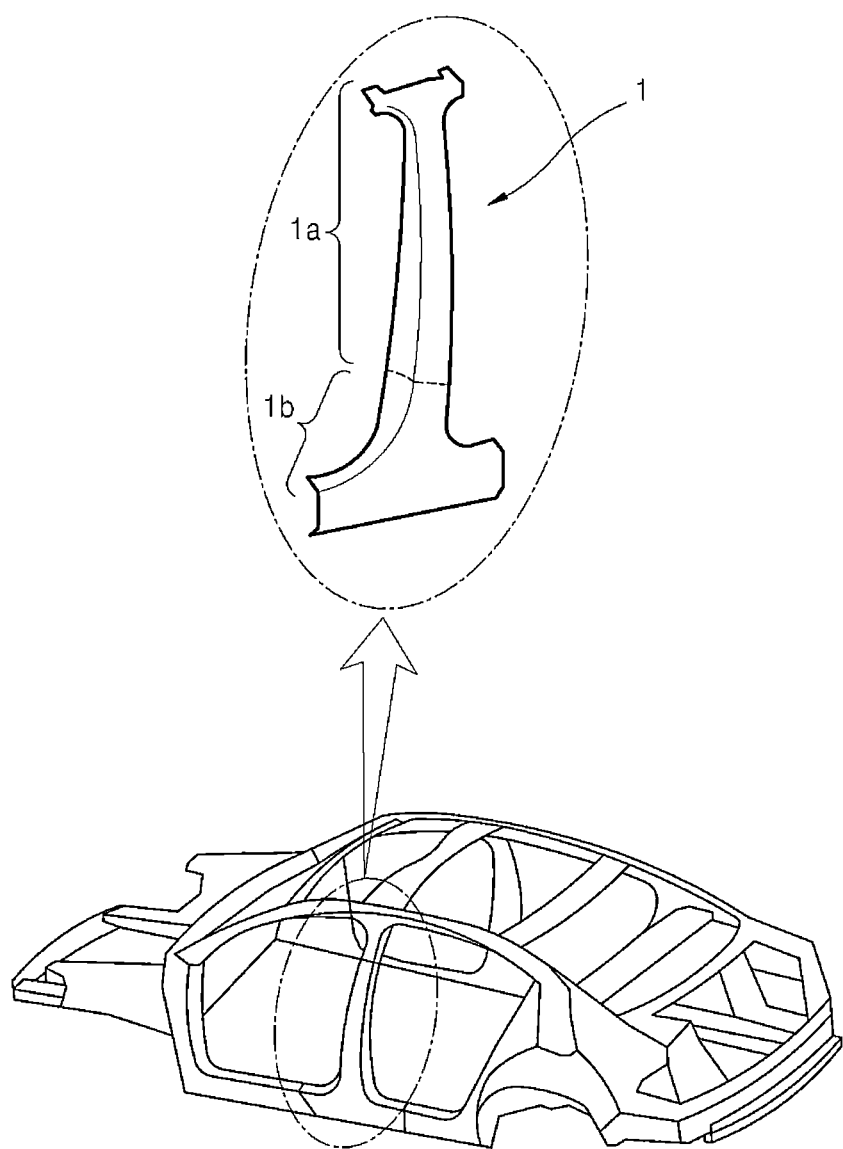
FIG. 1 is a schematic view of a B-pillar and a chassis structure of a vehicle.

Embodiments of the invention will now be described in detail with reference to the accompanying drawings.

It should be understood that the present invention is not limited to the following embodiments and may be embodied in different ways, and that the embodiments are given to provide complete disclosure of the invention and to provide a thorough understanding of the invention to those skilled in the art. The scope of the invention is defined only by the claims. Like components will be denoted by like reference numerals throughout the specification.

First, a method of manufacturing a tailor welded blank will be described.

The present invention relates to a method of manufacturing a tailor welded blank by laser-welding blank elements of different materials or thicknesses, in which the tailor welded blank has different physical properties according to sections thereof. Specifically, the present invention is aimed at solving a problem that, when blank elements are made of coated steel plates, coating layers of the coated steel plates are fused and intrude into a welded zone upon laser welding, thereby causing defects in the welded zone.

When the blank elements made of the coated steel plate are laser-welded together, the coating layer of the coated steel plate is fused and intrudes into the welded zone.

That is, the welded zone has a composition in which a base material is mixed with the coating layer of the coated steel plate, whereby the welded zone has different physical properties than the base material.

Particularly, when the tailor welded blank is subjected to hot stamping, intrusion of the coating layer components into the welded zone causes reduction in strength of the welded zone.

For hot stamping, the tailor welded blank is mainly composed of a base material formed of a boron steel plate having hardenability, and an Al—Si coating layer formed on the base material. Thus, the welded zone contains the components of the welded coating layer and has a composition in which the Al and Si content increases above that of the base material. As a result, after hot stamping, the welded zone has a structure in which martensite and ferrite coexist, instead of the full martensite structure. As a result, the welded zone undergoes reduction in strength due to coexistence of the ferrite structure and the martensite structure.

The present invention is intended to design a composition of a filler wire by taking into account intrusion of the fused coating layer into the welded layer during laser welding of the blank elements made of the coated steel plate, and to provide desirable properties to the welded zone using the designed filler wire.

Figure 2:
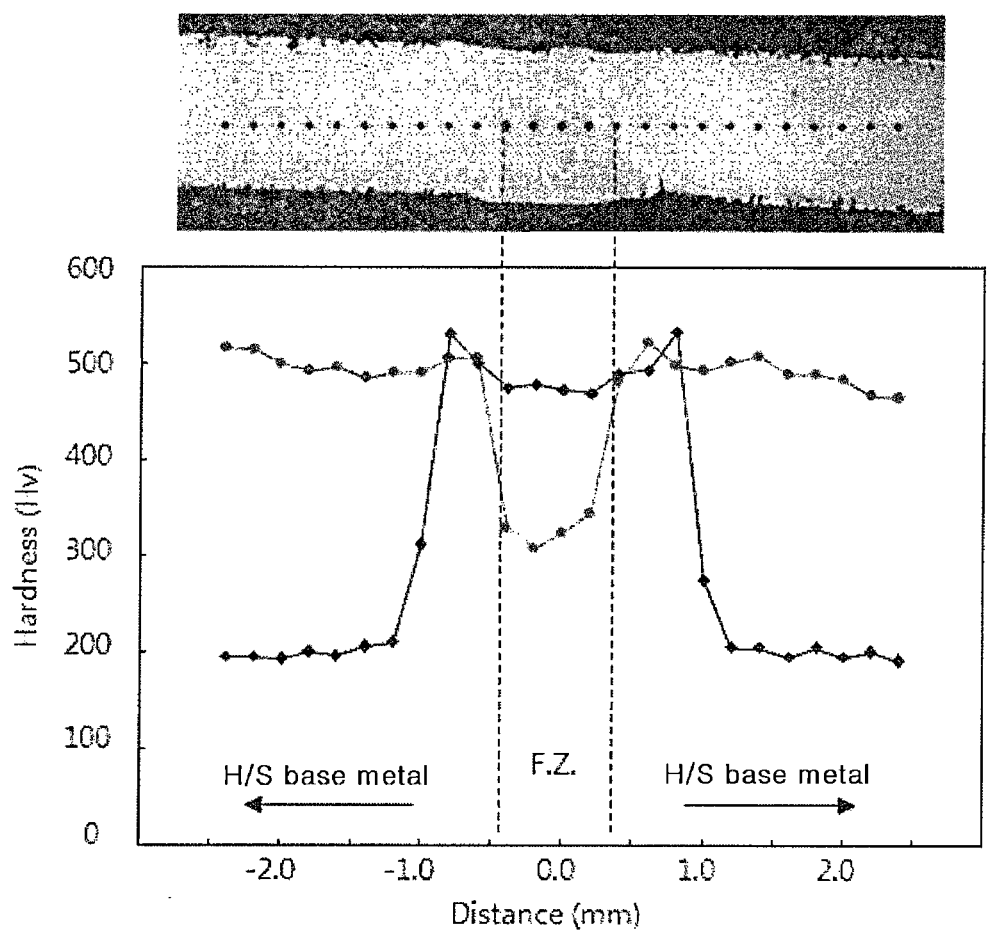
FIG. 2 shows a microstructure of a welded zone formed by laser welding without removing an Al—Si coating layer and a graph depicting hardness distribution of the welded zone before and after hot stamping.

FIG. 2 shows a microstructure of a welded zone formed by laser welding without removing an Al—Si coating layer, and graphs depicting hardness distribution of the welded zone before and after hot stamping.

As shown, before hot stamping (indicated by a blue graph), a welded zone has higher hardness than the base material, and a thermally-affected zone by welding has the highest hardness.

On the other hand, after hot stamping (indicated by a red graph), the hardness of the base material increases, whereas the hardness of the welded zone decreases.

Consequently, after hot stamping, the hardness (300 to 350 Hv) of the welded zone becomes lower than the hardness (500 Hv) of the base material.

Figure 5:
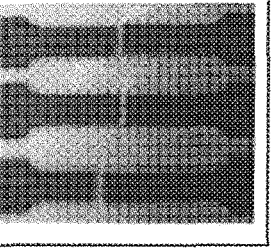
FIG. 5 is a table showing results of tensile testing in which a laser-welded sample having a coating layer is subjected to tensile force in a direction perpendicular to a welding line.

FIG. 5 shows results of tensile testing in which a laser-welded sample having a coating layer is subjected to tensile force in a direction perpendicular to a welding line.

As can be seen from the result, the welded zone has both lower yield strength and to tensile strength than the base material, and has an elongation not more than 10% of the elongation of the base material.

This results from the intrusion of the components (Al or Si) of the coating layer into the welded zone, and thus it can be seen that the welded zone decreases in both hardness and strength after hot stamping, providing a high possibility of failure at the welded zone upon vehicle collision.

Figure 3:
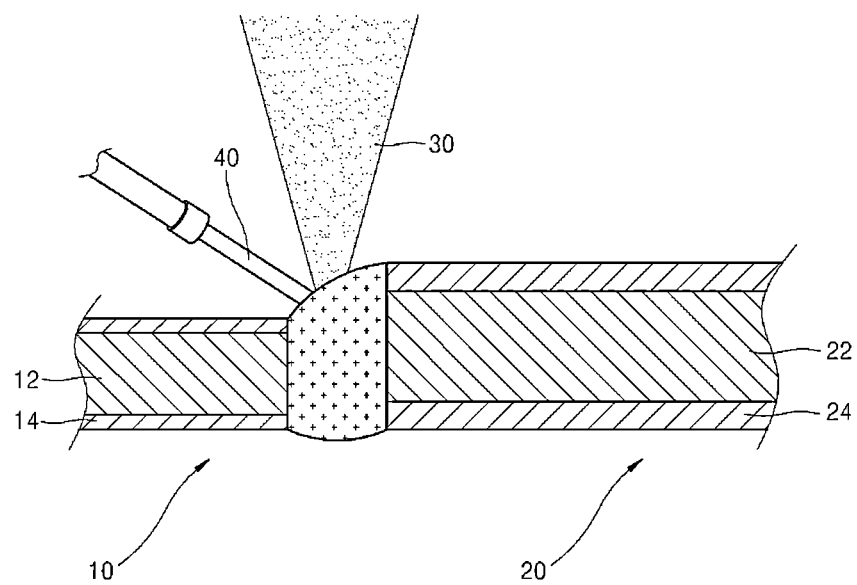
FIG. 3 is a diagram of a method of manufacturing a tailor welded blank according to one embodiment of the present invention.

FIG. 3 is a diagram of a method of manufacturing a tailor welded blank according to one embodiment of the present invention.

As shown, the method includes welding blank elements 10, 20, which include base materials 12, 22 and coating layers 14, 24 formed on the base materials, by a laser beam 30 using a filler wire 40, such that components of the filler wire 40, the base materials 12, 22 and the coating layers 14, 24 coexist in a welded zone.

According to the present invention, a composition of the filler wire 40 that will be fused and intrude into the welded zone is controlled to regulate a composition of the welded zone, thereby allowing the welded zone to have desired physical properties.

Each of the base materials 12, 22 may employ a boron steel plate having hardenability, and each of the coating layers 14, 24 may employ an Al—Si or Zn coating layer.

Considering intrusion of the coating layers 14, 24 into the welded zone, it is noted that the filler wire 40 has a composition which does not allow a ferrite structure to be formed in the welded zone at temperatures ranging from 900° C. to 950° C.

That is, the filler wire 40 has a higher amount of an austenite-stabilizing element than the composition of the coated steel plate base material such that the welded zone can have a full austenite structure without forming the ferrite structure even upon intrusion of the fused coating layer into the welded zone.

Figure 4:
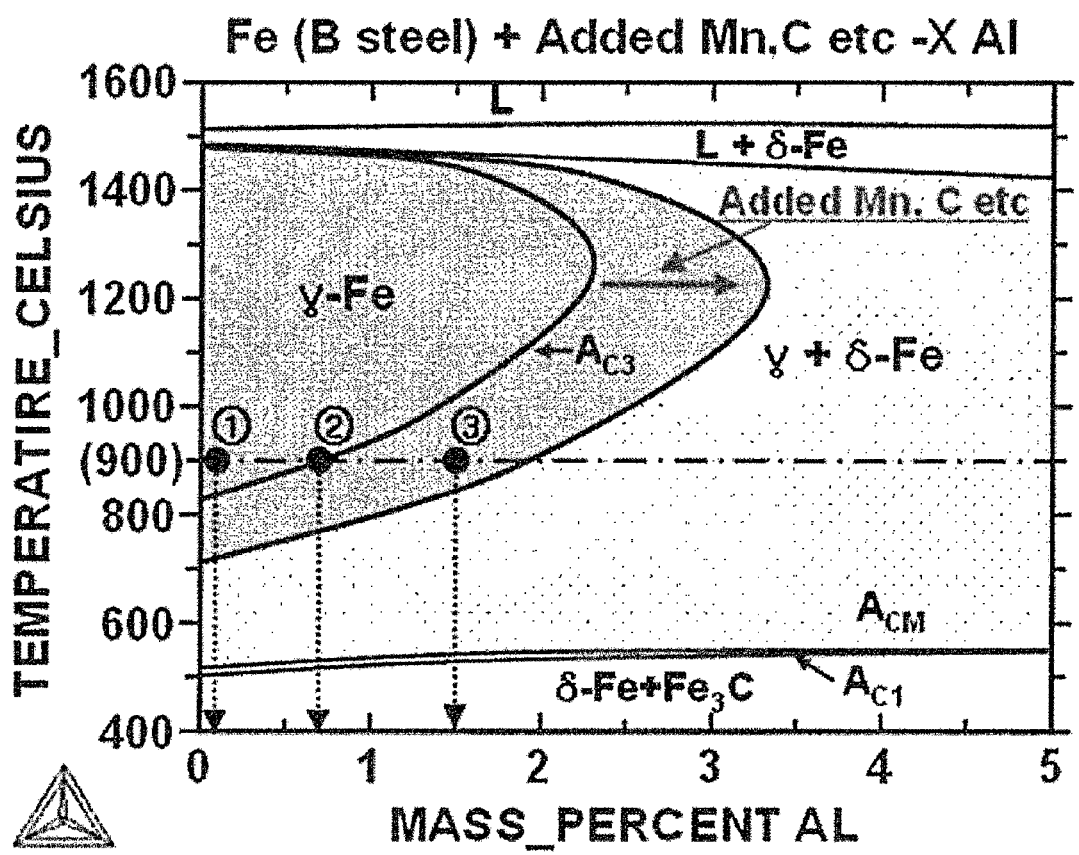
FIG. 4 is a graph depicting shift of a transformation curve according to increase in an amount of an austenite-stabilizing element.

FIG. 4 is a graph depicting shift of a transformation curve according to increase in an amount of an austenite-stabilizing element.

As shown, as the amount of the austenite-stabilizing element (such as C, Mn, etc.) increases, a temperature point Ac3 decreases and the transformation curve shifts to the right, thereby increasing an austenite structure loop.

In the present invention, the austenite-stabilizing element may include C or Mn.

When the filler wire includes a higher amount of the austenite-stabilizing element than the base material, the welded zone has a full austenite structure at hot stamping temperatures ranging from 800° C. to 950° C., and upon quenching of the welded zone, the full austenite structure is transformed into the full martensite structure.

In other words, even when the components of the coating layer intrude into a fused pool of the welded zone, the welded zone has the full martensite structure after hot stamping, because the filler wire contains a great amount of the austenite-stabilizing element.

Therefore, even though the coating layer is not removed and the components of the coating layer intrude into the welded zone, the welded zone is prevented from being decreased in hardness and strength, and thus has similar physical properties to the base material, thereby preventing failure of the welded zone upon collision.

In order to prevent generation of the ferrite structure in the welded zone due to intrusion of Al in the coating layer, the Mn content of the filler wire is 1.5 wt % to 7.0 wt % higher than that of the boron steel base material.

If the Mn content is below this range (i.e. below 1.5 wt %), the austenite loop is not so much enlarged, so that the ferrite structure coexists with the austenite structure in the welded zone at temperatures ranging from 800° C. to 950° C. Further, if the Mn content is above this range (i.e. above 7.0 wt %), the fused pool has decreased viscosity and a coefficient of expansion increases upon liquid-solid transformation, causing problems in the welded zone, such as shape quality deterioration, cracking, and the like.

Further, the C content of the coating layer may be 0.1 wt % to 0.8 wt % higher than that of the boron steel base material.

If the C content is lower than this range, the austenite loop is not so much enlarged, so that the ferrite structure coexists with the austenite structure in the welded zone at temperatures ranging from 800° C. to 950° C. Further, if the C content of the coating layer is above this range, the welded zone excessively increases in hardness and strength, causing problems in the welded zone such as failure upon collision.

As a result of evaluation, when SABC1470 steel plates each comprising: 0.22 wt % of C; 0.24 wt % of Si; 1.19 wt % of Mn, 0.0015 wt % of P; 0.0006 wt % of S; and the balance of Fe and unavoidable impurities were laser-welded without using a filler wire, a welded zone underwent failure upon tensile testing. Further, when the steel plates were laser-welded using a filler wire containing 0.6 wt % of C, the base material of the steel plate underwent failure.

As such, according to the present invention, blank elements made of coated steel plates having different strengths and thicknesses are laser-welded using a filler wire to provide a tailor welded blank, in which a laser-welded zone has a composition providing an austenite structure at temperatures ranging from 800° C. to 950° C. Therefore, the welded zone of the tailor welded blank does not suffer from reduction in strength and hardness even after hot stamping.

Although some exemplary embodiments have been described herein, it should be understood by those skilled in the art that these embodiments are given by way of illustration only, and that various modifications, variations and alterations can be made without departing from the spirit and scope of the present invention. Therefore, the scope of the present invention should be limited only by the accompanying claims and equivalents thereof.

What is claimed is:

1. A tailor welded blank manufactured by laser-welding blank elements made of coated steel plates having different strengths or thicknesses using a filler wire, wherein a laser-welded zone has a composition providing an austenite structure at temperatures ranging from 800° C. to 950° C.

2. The tailor welded blank according to claim 1, wherein the welded zone has a composition in which a base material and a coating layer of each of the coated steel plates are mixed with the filler wire.

3. A hot stamped component manufactured by hot stamping a tailor welded blank formed by laser-welding blank elements made of coated steel plates having different strengths or thicknesses using a filler wire, wherein a laser-welded zone has a martensite structure.

4. The hot stamped component according to claim 3, wherein each of the blank elements includes a boron steel plate having hardenability as a base material, and an Al—Si or Zn coating layer.

5. The hot stamped component according to claim 4, wherein the filler wire has a higher amount of an austenite-stabilizing element than the base material of the coated steel plate.

6. The hot stamped component according to claim 5, wherein the austenite-stabilizing element comprises C or Mn.

* * * * *